Nov. 17, 1931.  G. O. CURME, JR., ET AL  1,832,534
PROCESS FOR MAKING ETHYLENE DIAMINE
Filed Jan. 12, 1924
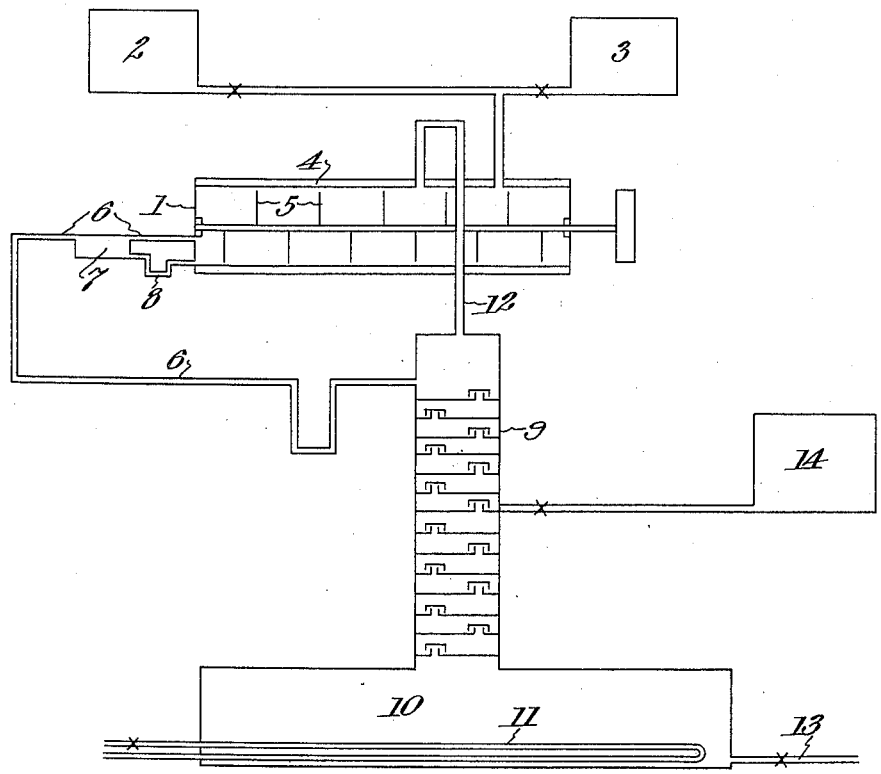

UNITED STATES PATENT OFFICE

GEORGE O. CURME, JR., OF CHARLESTON, WEST VIRGINIA, AND FRED W. LOMMEN, OF NEW YORK, N. Y., ASSIGNORS TO CARBIDE AND CARBON CHEMICALS CORPORATION, A CORPORATION OF NEW YORK

PROCESS FOR MAKING ETHYLENE DIAMINE

Application filed January 12, 1924. Serial No. 685,849.

The invention is a process for making ethylene diamine, and the object of the invention is to provide a process adapted for economical operation on an industrial scale.

If ethylene dichlorid is heated under pressure with ammonia (which may be introduced into the reaction vessel in aqueous solution), a reaction takes place in accordance with the following equation:

$$C_2H_4Cl_2 + 3NH_3 = NH_4Cl + C_2H_4(NH_2)_2 \cdot HCl.$$

If only the quantity of ammonia required by the equation is present in the reaction vessel, by-reactions also take place, the ethylene diamine first formed reacting with additional ethylene dichlorid and producing diethylene triamine, triethylene tetramine, and other compounds. To secure a maximum yield of the diamine from the dichlorid used, it has therefore been proposed to keep a large excess of ammonia (15 mols or more per mol of dichlorid) in the reaction zone to promote the diamine-forming reaction in which ammonia participates, and suppress the reactions in which ammonia does not participate but in which dichlorid is consumed. But so far as we are aware, such proposed process has only been attempted on a laboratory scale, and only by heating ethylene dichlorid and aqueous ammonia in a stationary sealed tube for several hours, cooling the tube, and transferring its entire contents to apparatus wherein the ethylene diamine is separated from the water, ammonium chlorid, and excess ammonia.

Such a process is not adapted for large scale operation. Since the materials are worked in batches, much time is lost in heating the reaction vessel and cooling it. Very large quantities of ammonia would be required in a plant having any considerable capacity. Ethylene dichlorid and aqueous ammonia are immiscible and differ greatly in specific gravity, so that contact between them is necessarily inefficiently attained in a stationary tube. This impedes the reaction and increases the temperature and pressure required to start the reaction. Once the reaction begins, stationary tube operation is objectionable for another reason, for the heat of reaction between ethylene dichlorid and ammonia is very great, and the conditions of operation just referred to are quite unfavorable for control of the temperature, and hence the pressure, during the reaction.

In accordance with our invention, a continuous process is provided, the ammonia being preferably continuously returned to the reaction vessel, so that a sufficient excess of ammonia can be maintained in the reaction zone with only a moderate amount of ammonia in process at any time. Provision is made for agitating the reacting materials whereby the reaction is expedited, temperature and pressure decreased, and more accurate control of conditions made possible.

An embodiment of our invention will now be described in connection with the accompanying diagrammatic drawing, showing a suitable arrangement of apparatus.

In the drawing, 1 is a pressure-tight reaction vessel into which ethylene dichlorid and aqueous ammonia are fed, preferably continuously, from storage tanks 2 and 3. The reaction vessel is provided with a heating-jacket 4, and an agitator 5. Liquid continuously overflows from the reaction vessel through line 6, which contains a settling chamber 7 having a trap 8 arranged to return to the reaction vessel any undecomposed ethylene dichlorid.

The liquid from line 6 discharges into column 9 which is provided with suitable vapor-and-liquid contact devices, and which surmounts the kettle 10 provided with heating coil 11. The vaporous product from the top of column 9 is returned to the reaction vessel through a vapor-line 12, while the liquid which collects in kettle 10 is drawn off at 13.

The reaction vessel 1 is initially charged with the quantity of ammonia which it is desired to maintain in excess, and this ammonia circulates through a cycle comprising the lines 6 and 12 and the tower 9. Ammonia is thereafter introduced into vessel 1 only in such quantity as is sufficient to replace that which is removed from the system either as its derivative, ethylene diamine; in combination as ammonium chlorid, if the latter is not decomposed in the apparatus; through leakage; or as free ammonia not recovered from the diamine solution.

The contents of the reaction vessel are kept in agitation, and a temperature sufficient to cause the reaction to proceed at a suitable rate is maintained.

The overflow through line 6 consists of an aqueous solution of ethylene diamine hydrochlorid, ammonium chlorid, and ammonia. As it passes down through tower 9, this liquid is gradually heated above the temperature prevailing in the reaction vessel and the ammonia is expelled as in standard ammonia distillation practice. This ammonia is returned through line 12 to the reaction vessel 1, as already stated, so that the requisite excess of ammonia is maintained in the reaction vessel.

It will be noted that a part of the ammonia added leaves the vessel 1 as ammonium chlorid. This may be decomposed for the recovery of its ammonia, either in a separate apparatus or in the same apparatus in which the free ammonia is recovered. In the drawing we have shown a storage tank 14 from which a strong base, such as sodium hydroxid, may be continuously fed into the column 9 in quantity sufficient to liberate the combined ammonia. Enough base may be used if desired to decompose the ethylene diamine hydrochlorid and liberate its base, which like the hydrochlorid is soluble in water.

The ethylene diamine or its hydrochlorid are removed from the apparatus as aqueous solution at 13. This solution will also contain ammonium chlorid or another metal chlorid, depending on the modification of the process followed, and the diamine compound may be recovered from this solution by methods forming no part of the present invention.

It will be observed that the quantity of ammonia which must be fed from tank 3 is only two-thirds as great when the ammonium chlorid formed is decomposed in the distillation apparatus 9, 10, as when it is not decomposed therein. Under the conditions which require the greater quantity of ammonia, the additional ammonia can be obtained by decomposing the ammonium chlorid in a separate apparatus.

The pressure prevailing in the apparatus will of course vary with the temperature. The temperature may be 110° C., more or less, and the pressure of the order of 10 atmospheres.

It will be understood that where an operation is referred to in the description and claims as proceeding continuously, it is not intended to imply that such operation proceeds at a constant rate, or even that its progress is uninterrupted. When the reaction product is drawn off from the reaction vessel at such a rate and ammonia is recovered therefrom and returned to the process at such a rate that the diamine forming reaction is substantially uninterrupted, that is to say, when the process is not of the "batch" type, the operations are continuous in the sense in which the term is used herein.

We claim:

1. Process of making ethylene diamine which comprises causing ethylene dichlorid to react with ammonia, the latter being present in excess, continuously removing ammoniacal solution of the diamine from the reaction vessel, and continuously recovering ammonia therefrom and returning it to the reaction zone without interrupting the progress of the diamine-forming reaction.

2. Process of making ethylene diamine which comprises causing ethylene dichlorid to react with ammonia, the latter being present in large excess, continuously removing ammoniacal solution of the diamine from the reaction vessel, raising the temperature of such solution to expel ammonia therefrom, and continuously returning the ammonia so recovered to the reaction zone without interrupting the progress of the diamine-forming reaction.

3. Process of making ethylene diamine which comprises causing ethylene dichlorid to react with ammonia, the latter being present in large excess, removing ammoniacal solution containing the diamine and ammonium chlorid from the reaction vessel, raising the temperature of such solution to expel free ammonia therefrom, adding a base to liberate combined ammonia, and expelling the ammonia thus liberated, and returning all the ammonia so recovered to the reaction zone without interrupting the progress of the diamine-forming reaction.

4. The process of making ethylene diamine which comprises adding ethylene dichloride to a reaction vessel, maintaining an excess of ammonia in said reaction vessel so as to react with said ethylene dichloride, removing ammoniacal solution of the diamine from the reaction vessel, continuously removing ammonia therefrom and returning it to the reaction zone, and discharging the residual diamine containing substance.

In testimony whereof, I affix my signature.
GEORGE O. CURME, Jr.

In testimony whereof, I affix my signature.
FRED W. LOMMEN.